(12) United States Patent
Abegnoli et al.

(10) Patent No.: US 12,267,203 B2
(45) Date of Patent: Apr. 1, 2025

(54) NETWORK ACCESS CONTROL FOR DEVICES IN A SOFTWARE DEFINED ACCESS (SDA) FABRIC

(71) Applicant: Cisco Technology, Inc., San Jose, CA (US)

(72) Inventors: Eric Levy Abegnoli, Valbonne (FR); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 610 days.

(21) Appl. No.: 16/256,544

(22) Filed: Jan. 24, 2019

(65) Prior Publication Data

US 2020/0244519 A1 Jul. 30, 2020

(51) Int. Cl.
*H04L 41/0659* (2022.01)
*H04L 9/40* (2022.01)
*H04L 61/103* (2022.01)
*H04L 45/64* (2022.01)
*H04L 101/622* (2022.01)

(52) U.S. Cl.
CPC ........ *H04L 41/0661* (2023.05); *H04L 61/103* (2013.01); *H04L 63/101* (2013.01); *H04L 45/64* (2013.01); *H04L 2101/622* (2022.05)

(58) Field of Classification Search
CPC ............... H04L 41/0672; H04L 61/103; H04L 61/6022; H04L 63/101; H04L 45/64; H04L 41/0661; H04L 2101/622
See application file for complete search history.

(56) References Cited

U.S. PATENT DOCUMENTS

| 6,134,665 | A | * | 10/2000 | Klein | G06F 1/3209 |
| | | | | | 713/300 |
| 8,107,396 | B1 | * | 1/2012 | Sharma | H04L 61/103 |
| | | | | | 370/254 |
| 9,426,060 | B2 | * | 8/2016 | Dixon | H04L 12/184 |
| 10,581,793 | B1 | * | 3/2020 | Semwal | H04L 12/4641 |
| 2007/0022211 | A1 | * | 1/2007 | Shimizu | H04L 29/12028 |
| | | | | | 709/238 |

(Continued)

FOREIGN PATENT DOCUMENTS

WO     WO 2007/136400 A1 * 11/2007 ............... H04N 7/16

*Primary Examiner* — Boris D Grijalva Lobos
*Assistant Examiner* — Timothy Sowa
(74) *Attorney, Agent, or Firm* — Merchant & Gould P.C.

(57) ABSTRACT

A first address resolution request may be received by a first access switch from a first device and the address resolution request may be resolved by the first access switch with a central database of a network. Then a second address resolution request may be sent to a sensor by the first access switch in response to resolving the first address resolution request. An address resolution response may then be sent by the sensor to the first device in response to the sensor determining that the first device is a bad endpoint. A session may then be established between the sensor and the first device in response to the sensor sending the address resolution response. The first device may then be prompted by the sensor via the established session to resolve issues that lead the sensor to determine that the first device is a bad endpoint.

20 Claims, 4 Drawing Sheets

(56) References Cited

U.S. PATENT DOCUMENTS

| | | | | |
|---|---|---|---|---|
| 2008/0069100 A1* | 3/2008 | Weyman | .................. | H04L 45/04 |
| | | | | 370/390 |
| 2010/0107162 A1* | 4/2010 | Edwards | ............... | G06F 9/5077 |
| | | | | 718/1 |
| 2010/0309813 A1* | 12/2010 | Singh | .................. | H04L 12/2801 |
| | | | | 370/254 |
| 2010/0325257 A1* | 12/2010 | Goel | ................. | H04L 29/12028 |
| | | | | 709/223 |
| 2013/0083782 A1* | 4/2013 | Murphy | ................ | H04L 61/103 |
| | | | | 370/338 |
| 2013/0294451 A1* | 11/2013 | Li | ........................... | H04L 45/66 |
| | | | | 370/392 |
| 2014/0050091 A1* | 2/2014 | Biswas | ................... | H04L 45/64 |
| | | | | 370/235 |
| 2015/0271086 A1* | 9/2015 | Hellhake | ........... | H04W 28/0289 |
| | | | | 370/235 |
| 2016/0197876 A1* | 7/2016 | Bui | ....................... | H04L 61/103 |
| | | | | 370/392 |
| 2017/0134336 A1* | 5/2017 | Chen | ..................... | H04L 61/103 |
| 2018/0167313 A1* | 6/2018 | Qiao | ..................... | H04L 45/745 |
| 2018/0278513 A1* | 9/2018 | Johnsen | ............... | G06F 16/2255 |
| 2019/0034226 A1* | 1/2019 | Gao | .................... | H04L 61/6009 |

* cited by examiner

NETWORK ACCESS CONTROL FOR DEVICES IN A SOFTWARE DEFINED ACCESS (SDA) FABRIC

TECHNICAL FIELD

The present disclosure relates generally to network access control for devices in a Software Defined Access (SDA) fabric.

BACKGROUND

The Internet-of-things (IoT) is a network including devices such as vehicles, and home appliances that contain electronics, software, actuators, and connectivity that allows these things to connect, interact, and exchange data. The IoT involves extending Internet connectivity beyond standard devices, such as desktops, laptops, smartphones and tablets, to any range of traditionally dumb or non-internet-enabled physical devices and everyday objects. Embedded with technology, these devices may communicate and interact over the Internet, and they may be remotely monitored and controlled.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
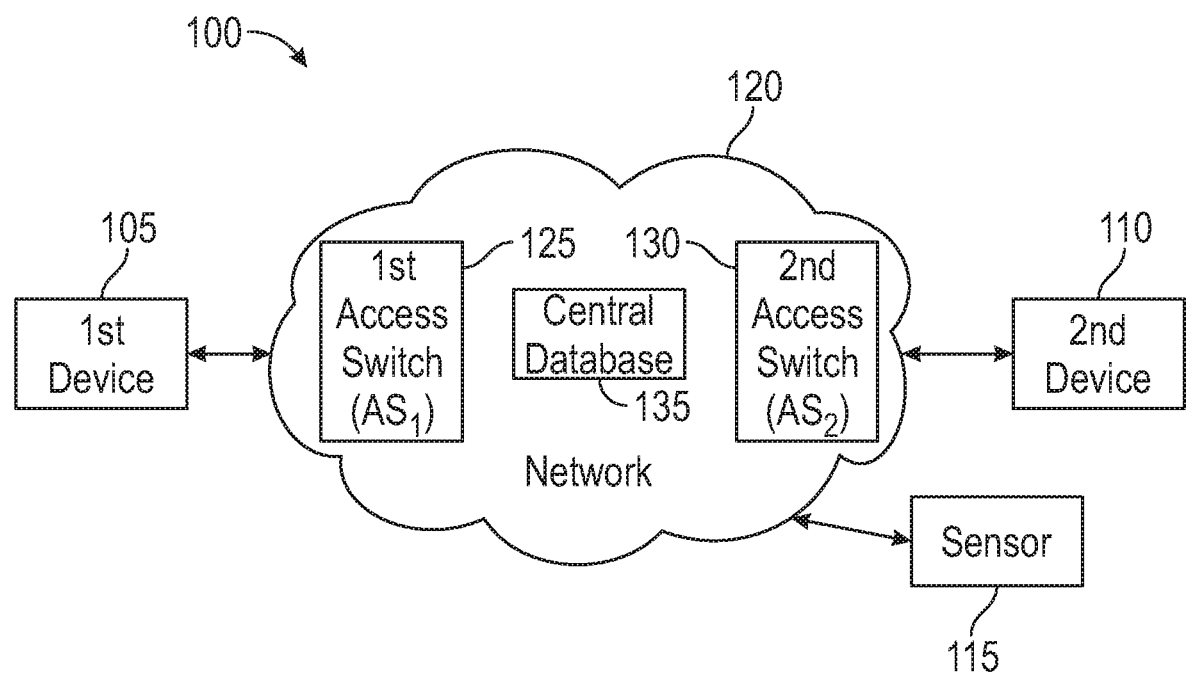
FIG. 1 is a block diagram of a system for providing network access control for devices in a Software Defined Access (SDA) fabric.

Network access control for devices in a Software Defined Access (SDA) fabric may be provided. First, a first address resolution request may be received by a first access switch from a first device and the address resolution request may be resolved by the first access switch with a central database of a network. Then a second address resolution request may be sent to a sensor by the first access switch in response to resolving the first address resolution request. An address resolution response may then be sent by the sensor to the first device in response to the sensor determining that the first device is a bad endpoint. A session may then be established between the sensor and the first device in response to the sensor sending the address resolution response. The first device may then be prompted by the sensor via the established session to resolve issues that lead the sensor to determine that the first device is a bad endpoint.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Some network management/security solutions may operate at layer-2 to attract traffic that may have been originally targeting a different endpoint. These solutions may be popular with the IoT environment because it may be a way to manage un-manageable devices. Instead of enforcing strict device policies, traffic (e.g., sent from outdated/not properly secured IoT devices) may be attracted into a "honey pot", where a man-in-the-middle software may secure and manage the devices.

As a further example of these network management/security solutions, consider a network with a series of endpoints (e.g., IoT devices), some being up-to-date and known by the management system, some outdated or unknown. Two such endpoints (e.g., E1 and E2) may both be trying to reach a target T. E1 may be known as a "good" (e.g., registered, up-to-date) device and E2 may not be "good". When E1 searches (e.g., sends an ARP request) for the location of T, a management station (e.g., "S") may check the status of E1. Because S may determine E1 to be a "good" device, S may remain silent. T may identify itself as the target (e.g., sends an ARP reply) and a session may be established between E1 and T. However, when E2 searches for the location of T, S may identify E2 as a "bad" device, and may respond on behalf of T. In this case, the session may then be established between E2 and S, which may prompt E2 to register, update software, etc.

The aforementioned example may work because two endpoints (e.g., T and S) may be getting the original request (e.g., ARP) broadcasted from the device (e.g., E1 or E2) at an early stage of a session setup. However, in order to scale with software defined access, broadcast may be filtered out and replaced by layer-2 unicast to the target "discovered" on its point of attachment and stored centrally in a central database (e.g., in a LISP MAP server). In such an environment, the previous example may not work well because any given Internet Protocol (IP) address may be bound to either the legitimate Media Access Control (MAC) address of the endpoint, or to the MAC address of S, depending on which endpoint (e.g., good or bad) is accessing it. One aspect of the central database is that an IP address may only be known in one location, bound to only one MAC (note however that several IP address may be bound to the same MAC, while the reverse may not be true). This may be specifically problematic for IoT devices because these devices may not be managed in the same way as Personal Computers (PCs) or servers for example. Re-enabling the broadcast messages may be problematic due to the large number of IoT devices.

FIG. 1 is a block diagram of a system 100 for providing network access control for devices in a Software Defined Access (SDA) fabric. As shown in FIG. 1, system 100 may comprise a first device 105, a second device 110, a sensor 115, and a network 120. Network 120 may comprise a first access switch 125 (i.e., $AS_1$), a second access switch 130

(i.e., $AS_2$), and a central database 135. For example, first device 105 and second device 110 may comprise, but are not limited to, IoT devices. Moreover, sensor 115 may comprise, but is not limited to, a Network Access Control (NAC) device. First device 105 and second device 110 may comprise "targets".

Elements of system 100 (e.g., first device 105, second device 110, sensor 115, first access switch 125, second access switch 130, and central database 135) may be practiced in hardware and/or in software (including firmware, resident software, micro-code, etc.) or in any other circuits or systems. The elements of system 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of system 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of system 100 may be practiced in a computing device 400.

First device 105, second device 110, sensor 115, first access switch 125, second access switch 130, and central database 135, may comprise, but are not limited to, an Internet-of-Things (IoT) device, a personal computer, a tablet device, a mobile device, a smartphone, a telephone, a remote control device, a set-top box, a digital video recorder, a cable modem, a cellular base station, a network computer, a mainframe, a switch, a router, or other similar microcomputer-based device. Network 120 may comprise any type of network and may utilize a Software Defined Access (SDA) fabric.

Consistent with embodiments of the disclosure, the edge (e.g., first access switch 125 and second access switch 130) of network 120 may be acted upon to convert address resolution requests (e.g., ARP requests) into two unicast messages, one sent to sensor 115 and the other one sent to a target device (e.g., second device 110). This conversion may be performed serially, where the first unicast message may be sent to sensor 115. Then, if no response is received from sensor 115 after a predetermined period of time or if a "go-ahead" response is received from sensor 115, the second unicast message may be sent to the target (e.g., second device 110).

Figure 2:
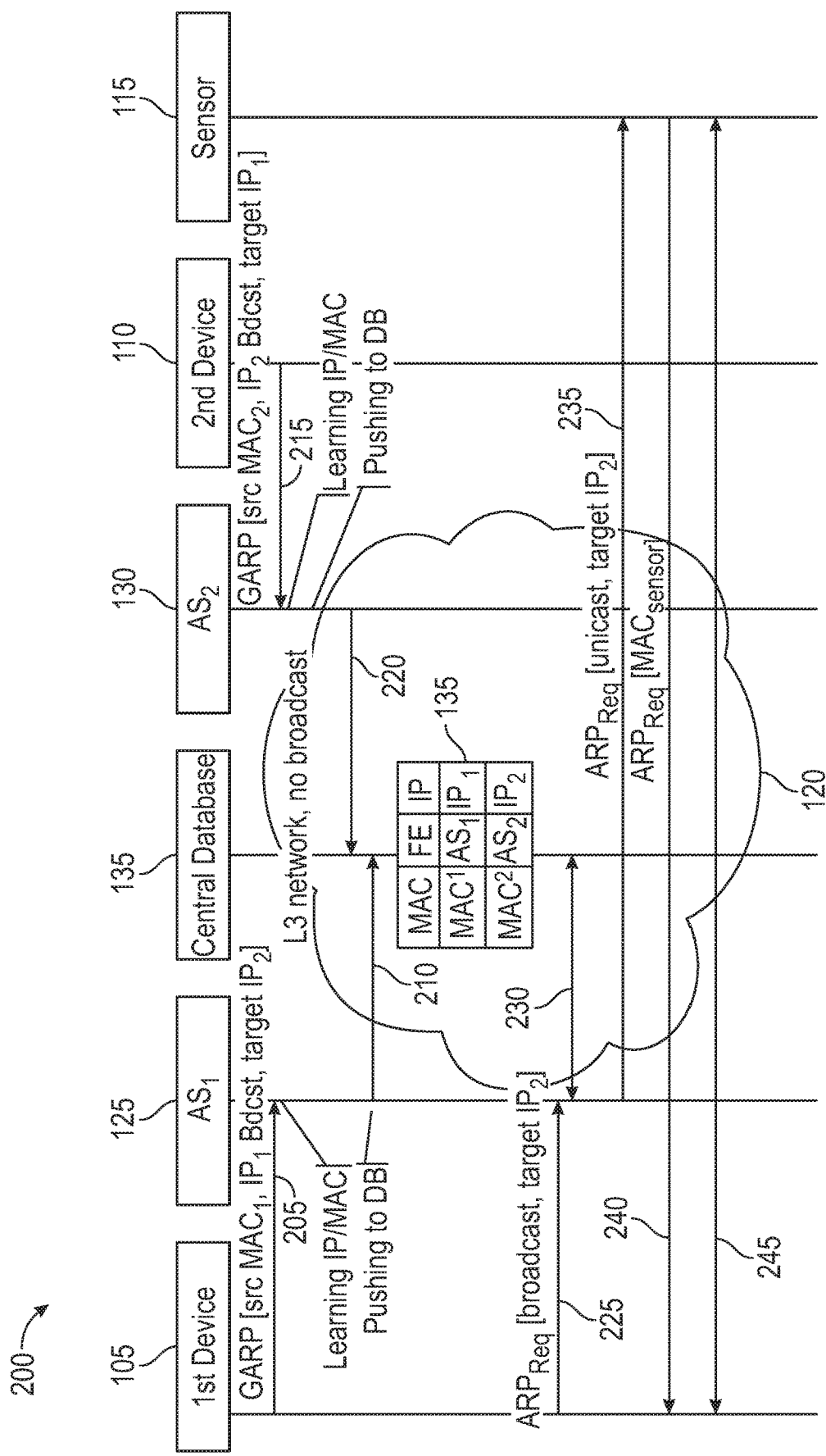
FIG. 2 is a state diagram of a method for providing network access control for devices in a Software Defined Access (SDA) fabric.

FIG. 2 is a state diagram 200 of a method consistent with embodiments of the disclosure for providing network access control for devices in an SDA fabric. The method of FIG. 2 may be implemented using system 100 for providing network access control for devices in an SDA fabric as described in more detail above with respect to FIG. 1. The method of FIG. 2 may correspond to an embodiment of the disclosure in which a device (e.g., first device 105) may have been determined to be a "bad" endpoint. Accordingly, sensor 115 may determine that first device 105 is not up-to-date/secured and may decide to take over the session.

As shown in FIG. 2, first device 105 may announce its presence to network 120 by sending, for example, a GARP message to first access switch 125. (State 205). In response, first access switch 125 may cause an entry to be made in central database 135 corresponding to first device 105. (State 210). For example, this entry may include first device 105's MAC address (e.g., $MAC_1$), the Fabric Edge (FE) device (i.e., first access switch 125) that first device 105 is connected to (e.g., $AS_1$), and first device 105's IP address (e.g., $IP_1$). As a result, first device 105 may be learned on network 120.

Similarly, second device 110 may announce its presence to network 120 by sending, for example, a GARP message to second access switch 130. (State 215). In response, second access switch 130 may cause an entry to be made in central database 135 corresponding to second device 110. (State 220). For example, this entry may include second device 110's MAC address (e.g., $MAC_2$), the Fabric Edge (FE) device (i.e., second access switch 130) that second device 110 is connected to (e.g., $AS_2$), and second device 110's IP address (e.g., $IP_2$). As a result, second device 110 may be learned on network 120.

Once first device is known to network 120, consistent with embodiments of the disclosure, the edge (e.g., first access switch 125) of network 120 may convert address resolution requests (e.g., ARP requests). For example, first access switch 125 may receive a first address resolution request (e.g., an ARP request) from first device 105. (State 225). The first address resolution request may be broadcast for example. Then, first access switch 125 may resolve the address resolution request with central database 135 of network 120. (State 230). First access switch 125 may then, in response to resolving the first address resolution request, send a second address resolution request to sensor 115. (State 235). The second address resolution request may be unicast, for example.

Upon receiving second address resolution request, sensor 115 may determine that first device 105 is a "bad" endpoint. For example, sensor 115 may determine that first device 105 is a "bad" endpoint if sensor 115 determines that software or firmware on first device 105 is not up-to-date or that first device 105 is not secured. Sensor 115 may determine that first device 105 is a "bad" endpoint based on other issues or aspects of first device 105 and is not limited to the aforementioned. Sensor 115 may then send an address resolution response to first device 105 in response to determining that first device 105 is a "bad" endpoint. (State 240).

After receiving the address resolution response from sensor 115, first device 105 and sensor 115 may establish a session between them. (State 245). This session may be used by sensor 115 to prompt first device 105 to resolve issues that lead sensor 115 to determine that first device 105 is a "bad" endpoint. For example, sensor 115 to prompt first device 105 to seek a software update or to secure itself.

Figure 3:
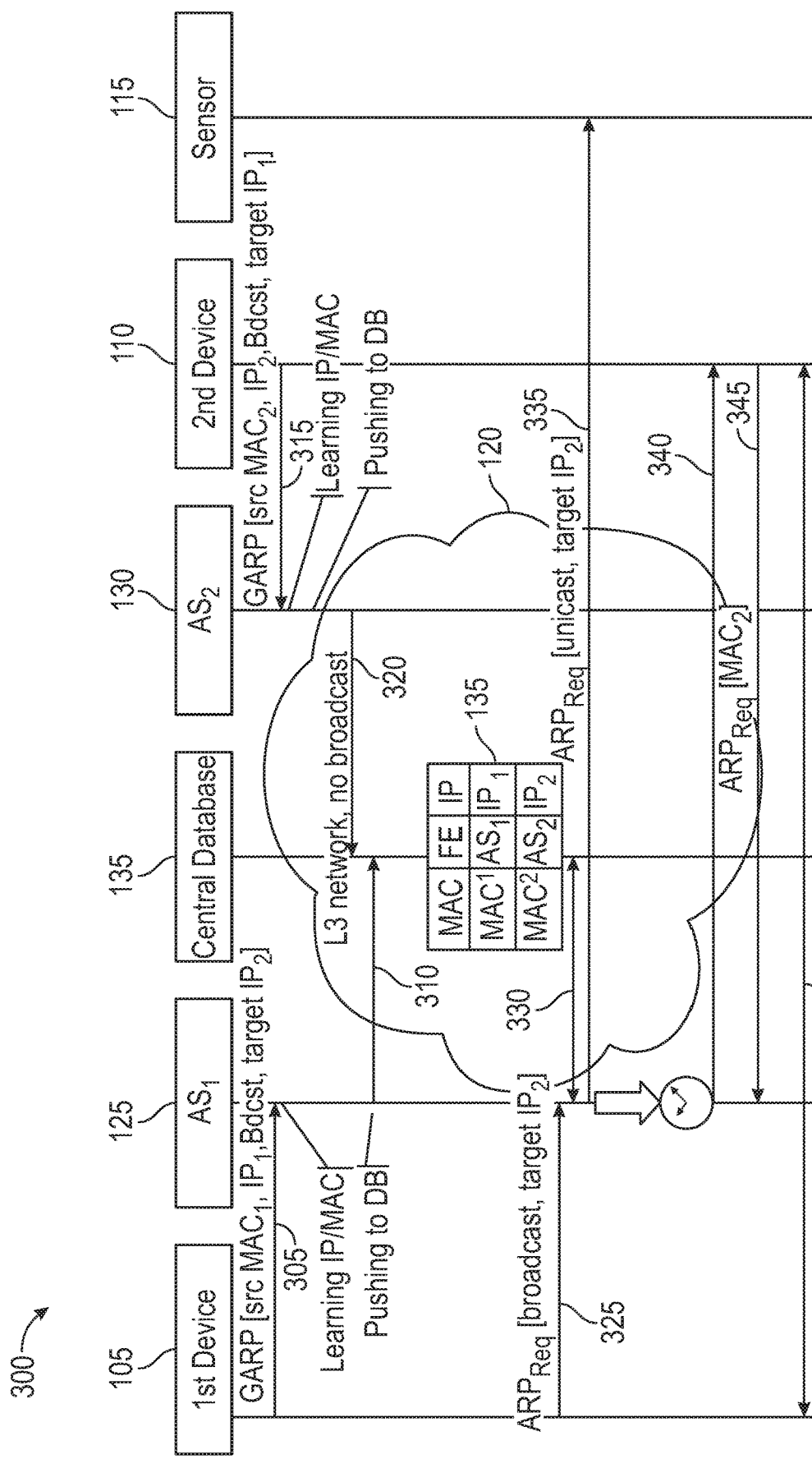
FIG. 3 is a state diagram of a method for providing network access control for devices in a Software Defined Access (SDA) fabric.

FIG. 3 is a state diagram 300 of a method consistent with embodiments of the disclosure for providing network access control for devices in an SDA fabric. The method of FIG. 3 may be implemented using system 100 for providing network access control for devices in an SDA fabric as described in more detail above with respect to FIG. 1. The method of FIG. 3 may correspond to an embodiment of the disclosure in which a device (e.g., first device 105) may have been determined not to be a "bad" endpoint (i.e., determined to be a "good" endpoint). For example, sensor 115 may find that first device 105 is in a good state. Then, from first access switch 125, after a predetermined period of time (e.g., sub-second), another address resolution request may be sent to the legitimate target (e.g., second device 110) that may have been previously learned on network 120.

As shown in FIG. 3, first device 105 may announce its presence to network 120 by sending, for example, a GARP message to first access switch 125. (State 305). In response, first access switch 125 may cause an entry to be made in central database 135 corresponding to first device 105. (State 310). For example, this entry may include first device 105's MAC address (e.g., $MAC_1$), the Fabric Edge (FE) device (i.e., first access switch 125) that first device 105 is connected to (e.g., $AS_1$), and first device 105's IP address (e.g., $IP_1$). As a result, first device 105 may be learned on network 120.

Similarly, second device 110 may announce its presence to network 120 by sending, for example, a GARP message to second access switch 130. (State 315). In response, second access switch 130 may cause an entry to be made in central database 135 corresponding to second device 110. (State 320). For example, this entry may include second device 110's MAC address (e.g., $MAC_2$), the Fabric Edge (FE) device (i.e., second access switch 130) that second device 110 is connected to (e.g., $AS_2$), and second device 110's IP address (e.g., $IP_2$). As a result, second device 110 may be learned on network 120.

Once first device 105 is known to network 120, consistent with embodiments of the disclosure, the edge (e.g., first access switch 125) of network 120 may convert address resolution requests (e.g., ARP requests). For example, first access switch 125 may receive a first address resolution request (e.g., an ARP request) from first device 105. (State 325). The first address resolution request may be broadcast for example. Then, first access switch 125 may resolve the address resolution request with central database 135 of network 120. (State 330). First access switch 125 may then, in response to resolving the first address resolution request, send a second address resolution request to sensor 115. (State 335). The second address resolution request may be unicast for example.

Then, first access switch 125 may send a third address resolution request to second device 110. (State 340). The third address resolution request may be unicast for example. The third address resolution request may be send by first access switch 125 in response to first access switch 125 not receiving a response from sensor 115 in response to the second address resolution request within a predetermined amount of time, for example. Or the third address resolution request may be sent by first access switch 125 in response to first access switch 125 receiving a "go-ahead" response from sensor 115 in response to the second address resolution request.

Next, second device 110 may send an address resolution response to first access switch 125 in response to the third address resolution request. (State 345). A session may then be established between first device 105 and second device 110 in response to second device 110 sending the address resolution response to first access switch 125. (State 350). In this example, one broadcast message (i.e., first address resolution request) may be converted into two unicast messages (i.e., second address resolution request and third address resolution request). One of the two unicast messages may be sent to sensor 115 and the other unicast message may be sent to a target device (e.g., second device 110). This conversion may be performed serially, where the first unicast message may be sent to sensor 115. Then, if no response is received from sensor 115 after a predetermined period of time or if a "go-ahead" response is received from sensor 115, the second unicast message may be sent to the target (e.g., second device 110).

Embodiments of the disclosure may work with any type of request (e.g., IPv6 Neighbor Solicit, etc.) and may not involve proxying on the access. Embodiments of the disclosure may include any given access to "manage" the state of "good" and "bad" targets (e.g., devices) per sensor (e.g., a NAC device). When the NAC responds to a resolution request, this may mean that the target is "bad". If the NAC does not respond, the target may be "good". This information may be stored in an access switch so that a next request asking for a "good" target may be immediately directed to it instead of transiting via the NAC, to save time. This may also lead an access switch itself to poll regularly the NAC with known targets to see if the NAC responds or not, and maintain their state (e.g., "good" or "bad") in the access switch, again to direct requests to either the NAC or the real (e.g., legitimate) target accordingly.

Furthermore, embodiments of the disclosure may include more than one sensor (e.g., NAC), and the access switch may serialize (e.g., or prioritize) the request to one or all of the multiple sensors. Moreover, embodiments of the disclosure may comprise an interface between the sensor (e.g., NAC) and the access switches where the sensor may proactively provide a list of "good" targets (e.g., devices).

Figure 4:
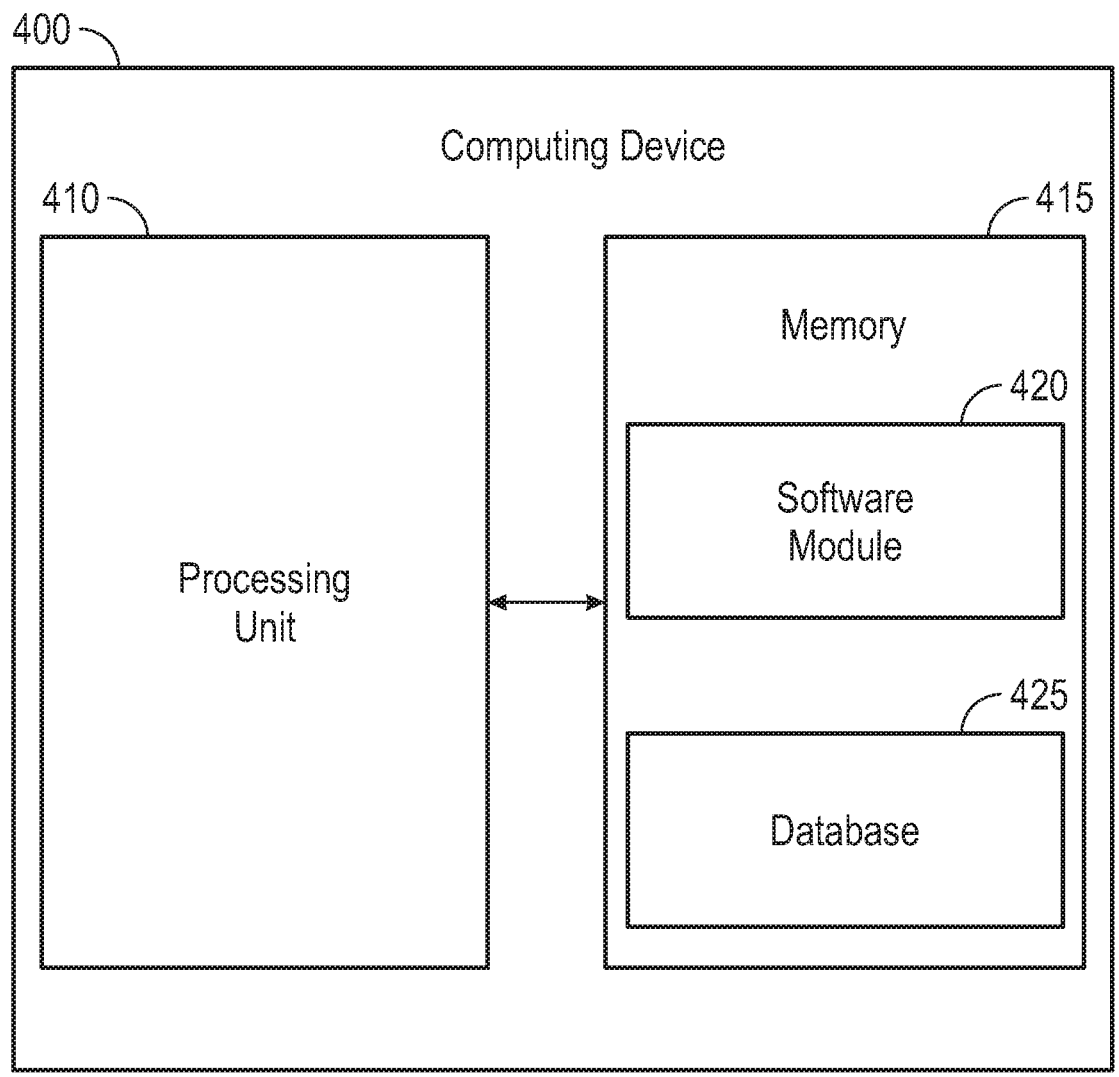
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing network access control for devices in a Software Defined Access (SDA) fabric, including for example, any one or more of the states from method 200 or 300 described above with respect to FIG. 2 and FIG. 3 above. Computing device 400, for example, may provide an operating environment for first device 105, second device 110, sensor 115, first access switch 125, second access switch 130, and central database 135. First device 105, second device 110, sensor 115, first access switch 125, second access switch 130, and central database 135 may operate in other environments and are not limited to computing device 400.

Computing device 400 may be implemented using an IoT device, a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multi-processor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, by a first access switch from a first device, a first address resolution request;
    resolving, by the first access switch with a central database of a network, the address resolution request; and
    sending, by the first access switch in response to resolving the first address resolution request, a second address resolution request to a sensor, wherein sending the second address resolution request comprises converting, by the first access switch, the first address resolution request into the second address resolution request and a third address resolution request, wherein each of the second address resolution request and the third resolution request is a unicast message, and wherein converting the first address resolution request into the second address resolution request and the third address resolution request comprises converting the first address resolution request serially into the second address resolution request and the third address resolution request, and wherein converting the first address resolution request serially into the second address resolution request and the third address resolution request further comprises:
    sending the second address resolution request to the sensor;
    sending, by the sensor to the first device in response to the sensor determining that the first device is a bad endpoint, an address resolution response;
    establishing a session between the sensor and the first device in response to the sensor sending the address resolution response;
    prompting, by the sensor via the established session, the first device to resolve issues that lead the sensor to determine that the first device is a bad endpoint; and
    sending the third address resolution request to a second device after the first device resolving the issues that lead the sensor to determine that the first device is a bad endpoint.

2. The method of claim 1, wherein receiving the first address resolution request comprises receiving the first address resolution request wherein the first address resolution request is broadcast.

3. The method of claim 1, wherein sending the second address resolution request to the sensor comprises sending the second address resolution request to the sensor comprising a Network Access Control (NAC) device.

4. The method of claim 1, wherein the sensor determining that the first device is a bad endpoint comprises the sensor determining at least one of the following: that the first device does not have up-to-date software and that the first device is not secured.

5. The method of claim 1, wherein sending by the sensor to the first device the address resolution response comprises sending by the sensor to the first device the address resolution response within a predetermined amount of time.

6. The method of claim 1, wherein receiving the first address resolution request comprises receiving the first address resolution request comprising an Address Resolution Protocol (ARP) request.

7. A method comprising:
receiving, by a first access switch from a first device, a first address resolution request;
resolving, by the first access switch with a central database of a network, the address resolution request;
sending, by the first access switch in response to resolving the first address resolution request, a second address resolution request to a sensor;
sending, by the first access switch in response to one of the following: not receiving a response from the sensor in response to the second address resolution request within a predetermined amount of time and receiving a go-ahead response from the sensor in response to the second address resolution request, a third address resolution request to a second device, wherein sending the second address resolution request comprises converting, by the first access switch, the first address resolution request into the second address resolution request and the third address resolution request, wherein each of the second address resolution request and the third resolution request is a unicast message, wherein converting the first address resolution request into the second address resolution request and the third address resolution request comprises converting the first address resolution request serially into the second address resolution request and the third address resolution request, and wherein converting the first address resolution request serially into the second address resolution request and the third address resolution request comprises:
sending the second address resolution request to the sensor, and
sending the third address resolution request to the second device in response to one of the following: the predetermined amount of time and receiving the go-ahead response from the sensor in response to the second address resolution request;
sending, by the second device to the first device in response to the third address resolution request, an address resolution response to the first access switch; and
establishing a session between the first device and the second device in response to the second device sending the address resolution response to the first access switch.

8. The method of claim 7, wherein receiving the first address resolution request comprises receiving the first address resolution request wherein the first address resolution request is broadcast.

9. The method of claim 7, wherein sending the second address resolution request to the sensor comprises sending the second address resolution request to the sensor comprising a Network Access Control (NAC) device.

10. The method of claim 7, wherein not receiving the response from the sensor to the second address resolution request within the predetermined amount of time comprises the sensor determining at least one of the following: that the first device has up-to-date software and that the first device is secured.

11. The method of claim 7, wherein receiving the first address resolution request comprises receiving the first address resolution request comprising an Address Resolution Protocol (ARP) request.

12. A system comprising:
a first access switch comprising;
a first memory storage; and
a first processing unit coupled to the first memory storage, wherein the first processing unit is operative to:
receive, from a first device, a first address resolution request;
resolve, with a central database of a network, the first address resolution request; and
send, in response to resolving the first address resolution request, a second address resolution request to a sensor, wherein the first processing unit being operative to send the second address resolution request comprises the first processing unit being operative to convert the first address resolution request into the second address resolution request and a third address resolution request, wherein each of the second address resolution request and the third resolution request is a unicast message, wherein the first address resolution request is converted serially into the second address resolution request and the third address resolution request, and
send the second address resolution request to the sensor; and
the sensor comprising;
a second memory storage; and
a second processing unit coupled to the second memory storage, wherein the second processing unit is operative to:
send, to the first device in response to determining that the first device is a bad endpoint, an address resolution response;
establish a session between the sensor and the first device in response to the sensor sending the address resolution response; and
prompt, via the established session, the first device to resolve issues that lead the sensor to determine that the first device is a bad endpoint, wherein the first processing unit is further operative to send the third address resolution request to the second device in response to the first device resolving the issues that lead the sensor to determine that the first device is a bad endpoint.

13. The system of claim 12, wherein the first address resolution request is broadcast.

14. The system of claim 12, wherein to the sensor comprises a Network Access Control (NAC) device.

15. The system of claim 12, wherein the second processing unit being operative to determine that the first device is a bad endpoint comprises the second processing unit being operative to determine at least one of the following: that the first device does not have up-to-date software and that the first device is not secured.

16. The system of claim 12, wherein the second processing unit being operative to send to the first device the address resolution response comprises the second processing unit being operative to send to the first device the address resolution response within a predetermined amount of time.

17. The system of claim 12, wherein the first address resolution request comprises an Address Resolution Protocol (ARP) request.

18. The method of claim 1, further comprising:
storing the address resolution response at the first access switch.

19. The method of claim 1, further comprising:
polling, by the first access switch, the sensor to determine address resolution responses for known devices.

20. The method of claim 1, further comprising:
proactively providing by the sensor address resolution responses for known devices.

* * * * *